United States Patent

[11] 3,566,994

[72] Inventor Harold Isaacs
2583 Fenwick Road, University Heights, Ohio 44124
[21] Appl. No. 812,055
[22] Filed Apr. 1, 1969
[45] Patented Mar. 2, 1971

[54] GROUND ENGAGING CART BRAKE
5 Claims, 3 Drawing Figs.

[52] U.S. Cl............................................... 188/5,
188/21, 188/119, 280/43.24, 280/46
[51] Int. Cl.................................................. B60t 1/14
[50] Field of Search............................................ 188/5, 6,
119, 21; 280/46, 43.24

[56] References Cited
UNITED STATES PATENTS
2,886,139 5/1959 Wilson ......................... 188/5
3,307,658 3/1967 Stevenson .................... 188/5
FOREIGN PATENTS
991,731 6/1951 France ......................... 280/46

*Primary Examiner*—George E. A. Halvosa
*Attorney*—Edward E. Sachs

ABSTRACT: A brake used in conjunction with a four-wheel cart in which the brake is rotatably secured to the cart and includes several structural members for mounting an arcuate friction pad for ground contact and a lever for manipulating the arcuate member to control the movement of the cart.

PATENTED MAR 2 1971
3,566,994
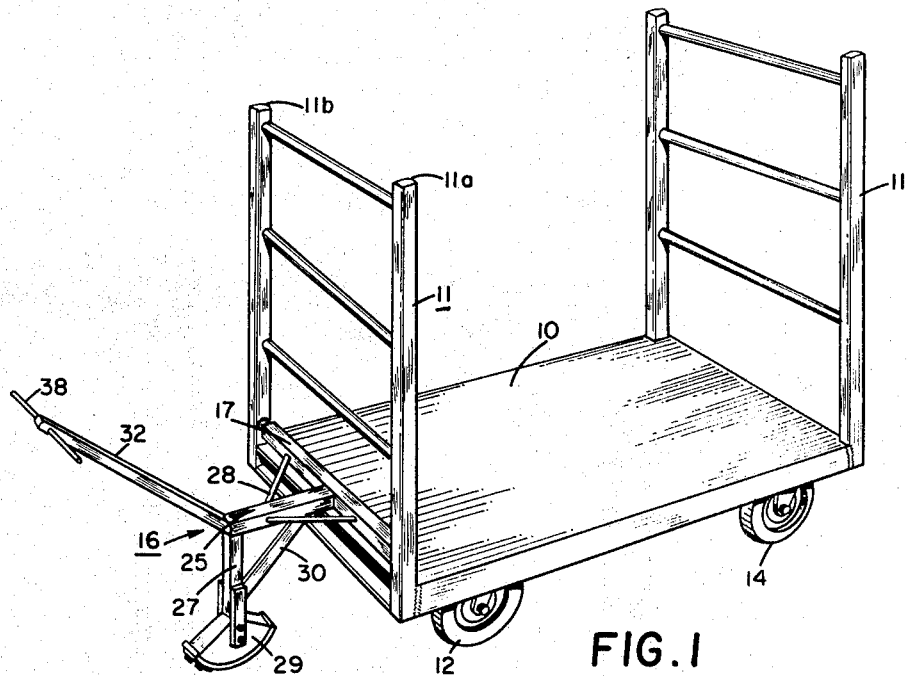
FIG.1
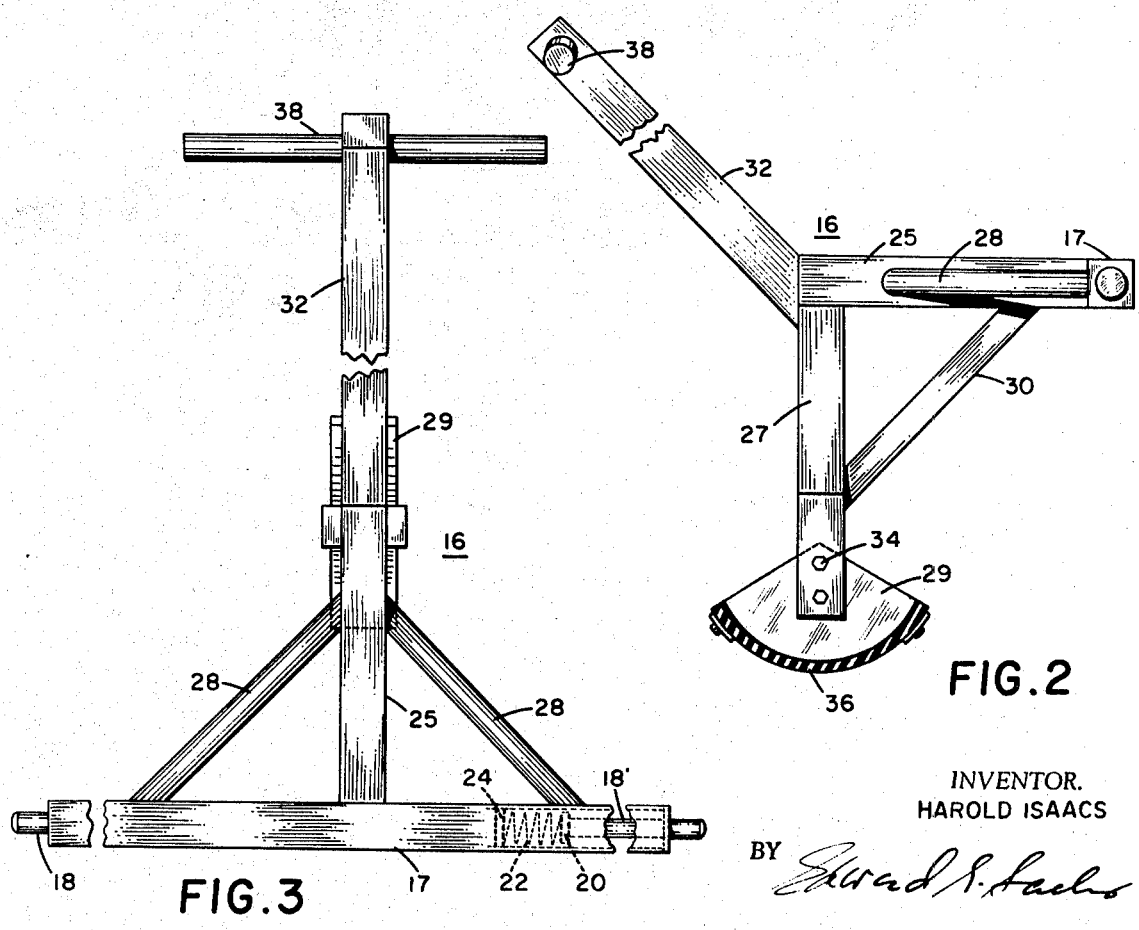
FIG.2
FIG.3
INVENTOR.
HAROLD ISAACS
BY Edward S. Sachs
ATTORNEY

GROUND ENGAGING CART BRAKE

The invention relates generally to hand brakes and, more specifically, to a manually operated brake for controlling the movement of a four-wheel cart.

In the art to which this invention pertains, it has been found necessary to provide braking mechanisms which can be secured to and detached from carts. These carts are used in warehouses, on trailers and in similar surroundings and frequently are used in trains, i.e., a plurality of carts are coupled together and are moved in unison either by pull chains or tractors. Various downwardly extending devices have been employed in the art to momentarily block the movement of the cart. However, serious shortcomings are evident in prior art devices in that many of these have the tendency to damage the flooring particularly in the case where metal rods are impacted against wooden floors. Others are ineffective to brake the movement of the carts to the degree and in the manner frequently desired. These brakes are primarily intended as dynamic brakes and their function as parking brakes is secondary.

The invention has the primary objective to provide a dynamic brake which, in response to the application of a sufficient force upon the handle causes the adjacent wheels of a moving cart to be momentarily raised off the ground, and due to frictional contact of the brake with the flooring to prevent any further movement of the cart.

Another object of the invention is to provide a brake for four-wheel carts in which the brake is adapted to prevent movement of the cart in the direction of the brake, while permitting movement in the opposite direction, to avoid a rollback of cart trains, such as occurs when the carts are stacked in trailers, or when the cart or trains thereof are placed on an inclined plane.

It is a further object of this invention to provide a brake for four-wheel carts in which the brake can be actuated by a simple manual downward movement of the handle and wherein the brake can be readily detached from the cart. The latter feature permits an interchange of the brake between the various carts of a cart train.

An aspect of the present invention resides in the provision of a brake which is used in combination with a four-wheel movable cart of the type having an upwardly extending frame. The brake includes a transverse rod extending substantially parallel to the wheel axes of the cart and the rod is provided with end means for rotatably connecting the rod to the frame. An arcuate support member provided with a friction pad of rubber or similar material and arranged in a manner so that the bottom of the cart wheels. The brake includes structural members connecting to and between the arcuate member and the transverse rod and these structural members are effective to suspend the arcuate member in dependent relationship to the rod; a handle connects to and extends upwardly from the structural member and is effective in response to a sufficient downward force to tilt the arcuate member and to cause the pair of adjacent cart wheels to be raised to an elevation comparatively higher than the elevation of the bottom of the frictional pad.

For a better understanding of the present invention, together with other and further objects thereof, reference is had to the following description taken in connection with the accompanying drawings, and its scope will be pointed out in the appended claims.

In the drawing:

FIG. 1 is a perspective view of a four-wheel cart together with the brake in accordance with this invention;

FIG. 2 is a side view of the brake shown in FIG. 1; and

FIG. 3 is a top view of the brake according to FIGS. 1 and 2.

Turning now to the drawing there is shown, for exemplary purposes, a four-wheel storage cart 10 having upwardly extending frame 11. The cart 10 is provided with two pairs of suspended wheels each pair having an axis which runs transverse to the length of the cart. In FIG. 1, one wheel 12, 14, of each pair of wheels is visible. The forward wheels 12 are swivel mounted while the mounting of the rear wheels 14 is rigid.

The cart 10 is provided with suitable openings or collars to receive portions of a cart brake 16 in accordance with this invention. The cart brake 16 comprises a transverse rod 17 extending substantially parallel to the wheel axes of the cart. The ends of the rod 17 are provided with pins 18 which are adapted to fit into and rotate within the openings or collars of frame 11, mentioned above. In order to facilitate insertion of the rod, between the corner posts 11a and 11b, one pin 18 is retractable under a spring bias as shown in FIG. 3. The latter arrangement comprises a telescoping pin portion 18' having at its inward end a guide plate 20 to maintain the pin in the proper position within the hollow rod or bar 17. Between plate 20 and a stationary abutment 24 there is interposed a spring 22 to forwardly bias the guide 20. The guide 20 is limited in its axial movement by means of stoppers not shown.

The transverse rod 17 is connected to a handle 32 and to a downwardly suspended support member 29 by means of a longitudinally extending structural member 25, such as a rod, which connects perpendicularly to the transverse rod 17 and at its opposite ends thereof to a downwardly extending structural member 27.

To strengthen the connection between the structural member 25 and rod 17 there are provided two angularly extending side braces 28, and an angularly extending side brace 30 connects to and between the structural members 25 and 27. The downwardly extending structural member is U-shaped at its lower end to receive within the opening of the the arcuate support member 29 which has a circumferential surface approximating an arc having an included angle of about 120°. The structural member 27 and the arcuate support member 29 are rigidly and securely mounted together by means of detachable bolts 34. To the bottom of the arcuate support member 29 there is secured a pad 36 of rubberlike material which complements the arcuate configuration and is arranged substantially coplanar with respect thereto. The rubberlike pad 36 is detachably secured to the arcuate member 29 so that upon wear of the friction pad 36 the latter may be readily replaced.

The handle 32 connects to the structural members 25 and 27 at the connecting joint and extends upwardly askew from this connection terminating at a point substantially above the elevation of the transverse rod 17 and being provided at the terminating end with a transverse handle bar 38.

In response to a sufficient downward force upon the handle 32 and more particularly upon the handle bar 38 thereof, the handle causes the arcuate support member 29 to be tilted and eventually causing the pair of adjacent swivel wheels (see wheel 12) to be raised to an elevation which is comparatively higher than the elevation of the bottom of the friction pad 36 thereby blocking the effective movement of the cart 10.

In the normal operation of the cart it is possible to leave the brake 16 unattended, no braking will occur unless the movement of the cart is in the direction of the brake in which case the brake will immediately and automatically block any such movement due to the frictional contact of the pad 36 with the ground. When the cart moves in a direction opposite to that of the location of the brake 16 there will be very slight frictional contact but movement of the cart will not be interfered with. However, it is possible, due to the rotatability of the transverse rod 17 to lift the handle 32 and to tie the same, by means not shown, to the frame 11 so that the friction pad 36 is spaced relative to the ground.

It will be appreciated from the above description that upon actuation of the brake 16 the cart 10, in conjunction with the brake, is supported at three points, all of which are rigid. The operator imparts only a minor amount of energy to the brake in order to obtain the desired braking result. This condition occurs when the cart 10 is moving in the direction of the brake 16 so that the energy necessary to lift the forward end of the cart 10 is essentially supplied by the kinetic energy of the forward moving mass of the cart.

Some cart designs, or accessories mounted on the carts, prevent the use of a straight rod 17 as shown in the drawing. To provide for such contingencies, the rod 17 is slightly curved (not shown) so that the midpoint region protrudes beyond the cart frame 11. The handle 32 and the downwardly extending structural member 27 are then directly connected to the midpoint region. This modification does not require a horizontal member 25.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

I claim:

1. A brake in combination with a four-wheel movable cart having an upwardly extending frame, the brake comprising:
 - a transverse rod extending substantially parallel to the wheel axes of the cart and pinlike means at each axial end of the rod for rotatably connecting the rod to the frame of said cart, with one of said pinlike means being axially depressible for snap action detachment of said rod from said cart;
 - a longitudinally extending rod connected perpendicularly to said transverse rod;
 - a downwardly extending rod having the upper end thereof connected to the longitudinally extending rod at the end remote from said cart;
 - an arcuate support member secured to the lower end of said downwardly extending rod having a friction pad secured thereto along the circumferential surface thereof, the bottom of the pad being in substantially the same plane as the bottom of the cart wheels; and
 - a handle member extending upwardly askew from the joint connection of said longitudinally extending rod and said downwardly extending rod, said handle member being effective in response to a sufficient downward force upon the handle to tilt the arcuate support member and cause the pair of adjacent cart wheels to be raised to an elevation comparatively higher than the elevation of the bottom of the frictional pad.

2. A brake in combination with a cart according to claim 1, wherein said frictional pad is composed of rubberlike material.

3. The brake in combination with a cart according to claim 2, wherein the frictional pad is effective to block movement of the cart when said movement is in the direction of the brake and effective to avoid such blocking when the cart movement is in the opposite direction.

4. A brake in combination with a cart according to claim 3, wherein said pad is detachably secured to said frictional member.

5. A brake in combination with a cart according to claim 3, wherein the arc of the said support member has an angle of approximately 120°.